(12) United States Patent
Najpauer

(10) Patent No.: US 10,602,658 B1
(45) Date of Patent: Mar. 31, 2020

(54) KIT FOR RETROFITTING A VEHICLE INTO A LAWN CARE VEHICLE

(71) Applicant: Ryan Najpauer, Allentown, PA (US)

(72) Inventor: Ryan Najpauer, Allentown, PA (US)

( * ) Notice: Subject to any disclaimer, the term of this patent is extended or adjusted under 35 U.S.C. 154(b) by 0 days.

(21) Appl. No.: 16/145,360

(22) Filed: Sep. 28, 2018

(51) Int. Cl.
| | |
|---|---|
| *A01C 23/04* | (2006.01) |
| *A01D 43/14* | (2006.01) |
| *A01M 7/00* | (2006.01) |
| *A01C 23/00* | (2006.01) |
| *A01D 101/00* | (2006.01) |

(52) U.S. Cl.
CPC .......... *A01C 23/047* (2013.01); *A01C 23/007* (2013.01); *A01D 43/14* (2013.01); *A01M 7/0039* (2013.01); *A01M 7/0089* (2013.01); *A01D 2101/00* (2013.01)

(58) Field of Classification Search
CPC .... A01C 23/047; A01C 23/007; A01D 43/14; A01M 7/0089; A01M 7/0039; A01M 7/0042; A01G 25/09
USPC ........................................ 137/355.12, 355.16
See application file for complete search history.

(56) References Cited

U.S. PATENT DOCUMENTS

| | | | |
|---|---|---|---|
| 2,570,573 A * | 10/1951 | Liboiron | A01G 25/095 239/735 |
| 4,308,676 A | 1/1982 | Doane | |
| 4,596,347 A * | 6/1986 | Hite | B62D 49/0671 224/280 |
| 4,725,004 A | 2/1988 | Baran, Jr. | |
| 4,821,959 A | 4/1989 | Browing | |
| 5,106,020 A | 4/1992 | Harrell | |
| 5,190,218 A | 3/1993 | Kayser et al. | |
| 5,195,308 A | 3/1993 | Grote et al. | |
| 6,279,838 B1 * | 8/2001 | Sivells et al. | A01G 25/09 239/146 |
| 6,502,771 B1 | 1/2003 | Wyne | |
| 6,976,441 B1 | 12/2005 | Speer | |
| 7,004,405 B1 * | 2/2006 | Elmore | A01G 25/09 137/355.12 |
| 2003/0041372 A1 * | 3/2003 | Yang | A47K 3/28 4/605 |
| 2011/0017848 A1 * | 1/2011 | Keith | A01C 23/008 239/722 |
| 2012/0090287 A1 | 4/2012 | O'Daniel | |

\* cited by examiner

Primary Examiner — Kevin L Lee
(74) Attorney, Agent, or Firm — Suzanne Kikel

(57) ABSTRACT

A kit for retrofitting a vehicle, such as a lawn mower or tractor, into a lawn care vehicle for distributing liquids for treatment of a lawn, the kit includes a base, a liquid tank, a hose reel, and a fluid flow control system. The fluid flow control system includes a dispensing hose on the hose reel and a hand-held hose. A Y-shape valve fluidically connects the dispensing hose and the hand-held hose to each other and to the liquid tank. The nozzles of the dispensing hose and the hand-held hose have a magnet so as to magnetically mount them anywhere on the vehicle, and the components of the kit may be mounted in various arrangements on the vehicle.

11 Claims, 5 Drawing Sheets

KIT FOR RETROFITTING A VEHICLE INTO A LAWN CARE VEHICLE

BACKGROUND OF THE INVENTION

1. Field of the Invention

The present invention relates to the general art of agriculture, and to the particular field of providing a kit for retrofitting an existing vehicle, such as a lawn mower or a tractor, and converting it into a lawn care vehicle for distributing liquids, such as fertilizers, weed killers, insecticides, and the like, for treatment of a lawn.

2. Brief Description of the Prior Art

With smaller, more conventional lawn mowers, including push lawn mowers or lawn mowers having horsepower ratings generally in the range of 3.0 to 18 horsepower and which do not have a separate power take-off, little use has been made of the engine to provide power to supplemental devices, especially to devices for pumping and spraying fluids.

Many homeowners rely on commercial lawn services to provide the necessary applications of fertilizers, weed killers, insecticides, and the like, in order to keep their lawns and gardens in proper condition. These control applications of the commercial lawn services are generally expensive and not always satisfactory as may otherwise be possible when the individual takes a personal interest in applying fertilizers, weed killers, and insecticides to their own yard or garden. Most devices available for fertilization by the homeowner are either drop or broadcast spreaders or liquid sprayers, which are hand pumped to provide adequate pressure to spray small areas. Some insecticide dispensers are readily available in the market place and they are designed to be easily incorporated with a household water source. That is, for example, an insecticide may be directly attached to a hose for its concurrent dispensing with the water from the hose. Such applications are limited in scope and may not be suitable for use over large areas. Also, these spraying devices, in general, may not have sufficient pressure to allow the application of insecticides, fertilizers, and/or weed killers to remote areas, including the upper reaches of some shrubbery and/or trees.

Spraying generally provides the most efficient way to apply lawn treatment liquids, such as fertilizers, insecticides, and weed killers over a relatively large area in a relatively uniform manner. The type of spraying apparatus necessary for a certain job depends on several factors. Very large scale jobs may utilize large scale equipment, which oftentimes, requires large trucks or tractors which support large liquid tanks, large booms, and large power sources in order to produce the required pressure to provide adequate spraying. On the other hand, various small scale jobs, such as home gardening tasks, may require only a hand-held, manually-operated sprayer and a spraying tank.

Many spraying jobs could be conducted most efficiently by utilizing a spraying kit which is sized in between those described herein above. A primary example would be residential or commercial lawns. A hand-held sprayer would be inefficient in terms of the time required, as well as a chance that the application would not be evenly distributed. A large spraying unit would not be easily maneuverable and/or could damage the lawn. A need, therefore, exists for what may be referred to as "medium-sized spraying kits".

Many lawn care chemical companies using large tank trucks have long hoses which are connected to hand-held spraying wands. The worker generally drives the truck to the location and then walks over the area to be sprayed. The advantage is that a large amount of liquid is always available and the worker can maneuver into almost any location in order to provide adequate spraying of the area.

Present day commercially available sprayers designed for use with lawn mowers are, in general, independently operated kits. Such kits are frequently hauled behind a conventional lawn mower and include their own separate power source, such as electrical or gas engines, for the pumping equipment associated with these kits. Other available sprayer kits are directly mounted to conventional lawn mowers; but here again these kits are operated by a separate power source, such as, for example an electrical or gas engine. In these kits, the requirement for a separate power source for utilization with the spray kit is not economical, and in many cases, is not efficient.

Many sprayed chemicals require an even distribution in order for them to be optimally effective; they require that the worker manually control the spraying nozzle; and there is a risk that the chemical applications will not be complete. Oftentimes, the worker cannot accurately monitor the areas which have been sprayed, and therefore, cannot insure that the chemicals have been evenly applied over the areas. Oftentimes, it is difficult for the worker to maintain a constant speed and a consistent application of chemicals when walking across the lawn since the worker is required to move the spraying device.

A still further concern with the present day chemical spraying kits is the exposure of the sprayed chemicals to the worker. Generally, the sprayed pattern is in front of the worker so that the worker can see the area being sprayed and the spraying device cannot be too cumbersome so that it can be easily manipulated by the worker. This results in the worker being close to the sprayed chemicals, which oftentimes, causes health issues for the worker.

Some lawn care specialists may have determined that the best medium sized spraying kit is to be combined with a small tractor, such as the larger type of lawn and garden tractors, or the smaller type of general purpose tractors. This would eliminate the operator from having to walk over the area to be sprayed and allows transport of significantly larger liquid holding tanks than could be manually carried or even manually pulled in a wagon or cart. Some problems may still exist in these kits.

Some chemical spraying kits use the direct current battery of the tractor to power a direct current electrical pump for the spraying operation. A main disadvantage with this type of kit is that the normal 6 volt battery or 12 volt battery is insufficient to produce adequate pressure for wide scale consistent spraying of the chemicals. For example, most of these kits could not handle more than three spraying heads or nozzles which are spaced a few feet apart. Still further, such kits cannot provide auxiliary functions, such as agitation of the liquid in the liquid tank in order to insure adequate mixing of the chemicals.

Some spraying kits employ hydraulic motors to provide adequate pumping action and pressure. However, the hydraulic motor must be added as part of the kit, or it must already exist on the tractor. Normally, such motors only exist on quite large tractors or trucks which would not be maneuverable in tight locations, and such tractors or trucks can not be driven on residential lawns because of their weight and potential damage to the lawn.

Some spraying kits use separate gasoline powered engines to develop the required pumping action and pressure. However, many times these types of kits are mounted on a trailer towed behind the tractor, which may be cumbersome. Also, gasoline engines of the required size are load, and may not be easily controlled in order to provide the required spraying action. Here again, an additional power source such as the gasoline engine may prove costly.

There is a need in the art to provide a system that allows one to mount a fertilizer, weed killer, insecticide and the like to a vehicle, such as a tractor or lawn mower and to easily switch from a grass cutting vehicle to a lawn care vehicle which distributes lawn treatment liquids, such as a fertilizer, week killer, insecticide, and the like.

There is a further need in the art for a medium sized spraying system which can be integrated with a small tractor without having to modify the tractor. Such a system would be economical in that it would utilize the power source of the tractor to power the spraying system. Additionally, the system would not require any customizing or expensive components. Such an arrangement would also have the advantage of being able to support a relatively large liquid holding tank, allowing the operator to significantly avoid exposure to any sprayed chemicals, and would also allow high maneuverability in combination with good control of ground speed and spraying pressure.

There is still a further need in the art to provide a system for spraying liquids with a small tractor or lawn mower which utilizes the power of the small tractor or lawn mower to provide the pumping action and spraying pressure required for the spraying means.

And yet, there is still a further need in the art to provide a system for spraying liquids which relies on the power source of the tractor or lawn mower and is adjustable with respect to the amount of pressure provided and still maintains the selected pressure at a generally constant and reliable level.

SUMMARY OF THE INVENTION

The present invention provides a system or kit for retrofitting a vehicle, such as a lawn mower or tractor, into a lawn care vehicle to expeditiously spray and apply a variety of liquid applications, such as liquid fertilizers, liquid insecticides, and/or liquid weed killers to a large and varied portion of a targeted area. The kit includes a base, a liquid tank, a hose reel, and a fluid flow control system. If the kit of the invention is used on a lawn mower or a tractor, then the liquid tank may be mounted on a frame of the lawn mower or tractor, which is generally used to support a bagging system for the mowing operation. The fluid flow control system includes a plurality of dispensing nozzles that are mountable on the lawn mower and which are connected to both a dispensing hose and to a hand-held hose. A Y-shape valve (not shown) is used to fluidically connect the dispensing hose and the hand-held hose to the liquid tank. The dispensing nozzles of the dispensing hose and the hand-held hose are magnetically constructed so as to be mountable anywhere on the lawn care vehicle. In some embodiments, the lawn care vehicle may be a lawn mower or a tractor.

More specifically, the kit of the invention comprises a plurality of nozzles that are magnetically mounted anywhere on the lawn care vehicle, a liquid tank, and a hose reel which are mounted on the bagger frame of the mower or tractor, with the fluid tank being mounted on the bagger frame beneath a bagger hood that has a portal defined there through for wires associated with controls for the dispensing unit. The kit enables a user to easily and inexpensively convert a lawn mower or a tractor into a law care vehicle with a dispensing unit which may be used to fertilize a desired area.

The kit of the present invention, in general, may be referred to as a "bolt-in kit" and may be used specially with an eXmark Zero-Turn Lawn Mower. The kit enables one to convert his/her lawn mower or tractor into a lawn care vehicle for treatment, such as fertilization, of the land. The kit provides an inexpensive way of utilizing a person's existing equipment to treat lawns without having to purchase an additional vehicle or machine, which may cost thousands of dollars. The kit is bolted onto the lawn mower or tractor.

These and other features and advantages of the present invention will be better appreciated and understood when the following description is read along with the accompanying drawings.

BRIEF DESCRIPTION OF THE DRAWINGS

The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

Figure 1:
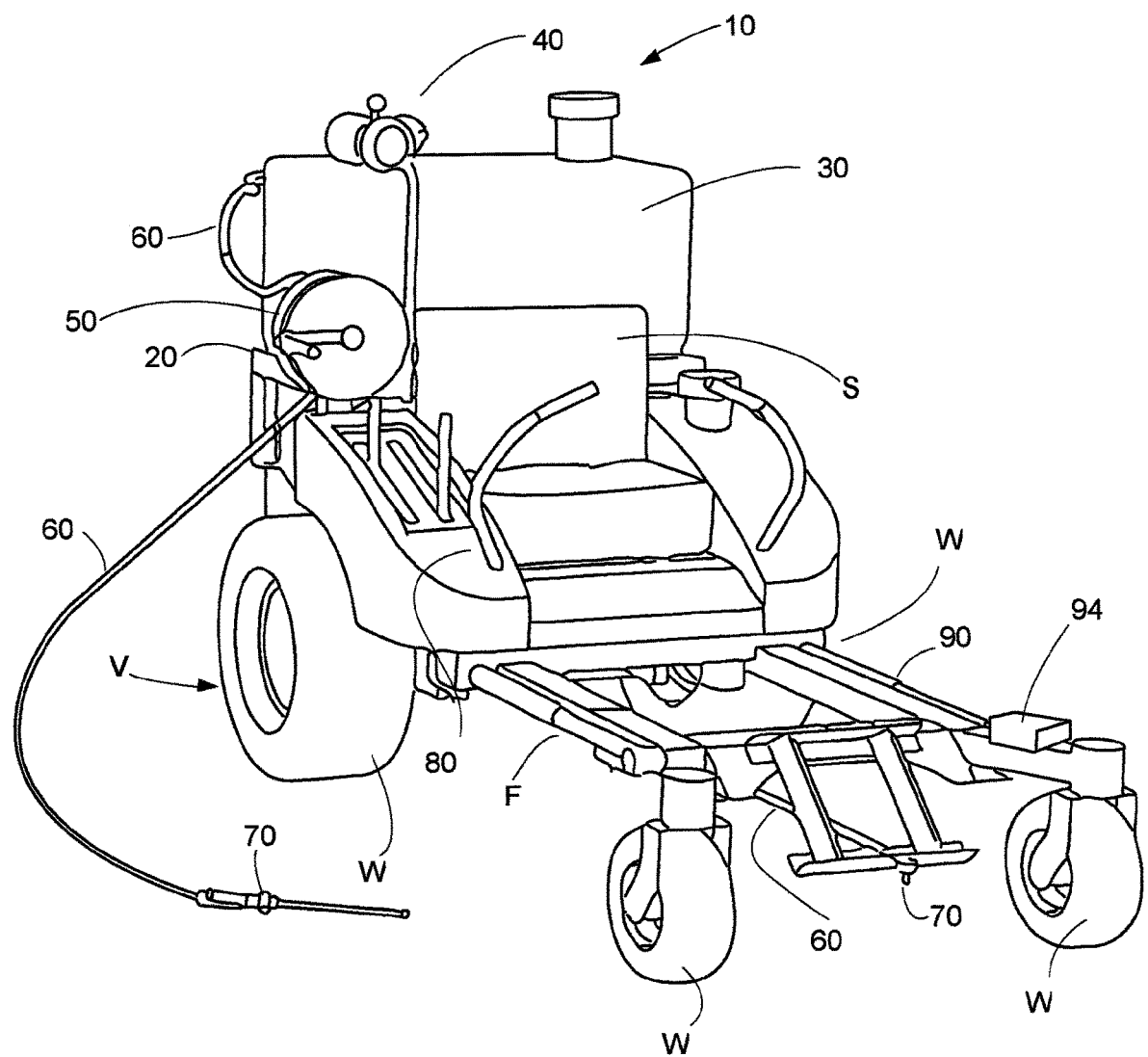
FIG. 1 is a front perspective, schematic view of a lawn care vehicle illustrating a first embodiment for an arrangement of the components of the kit of the present invention.
Figure 2:
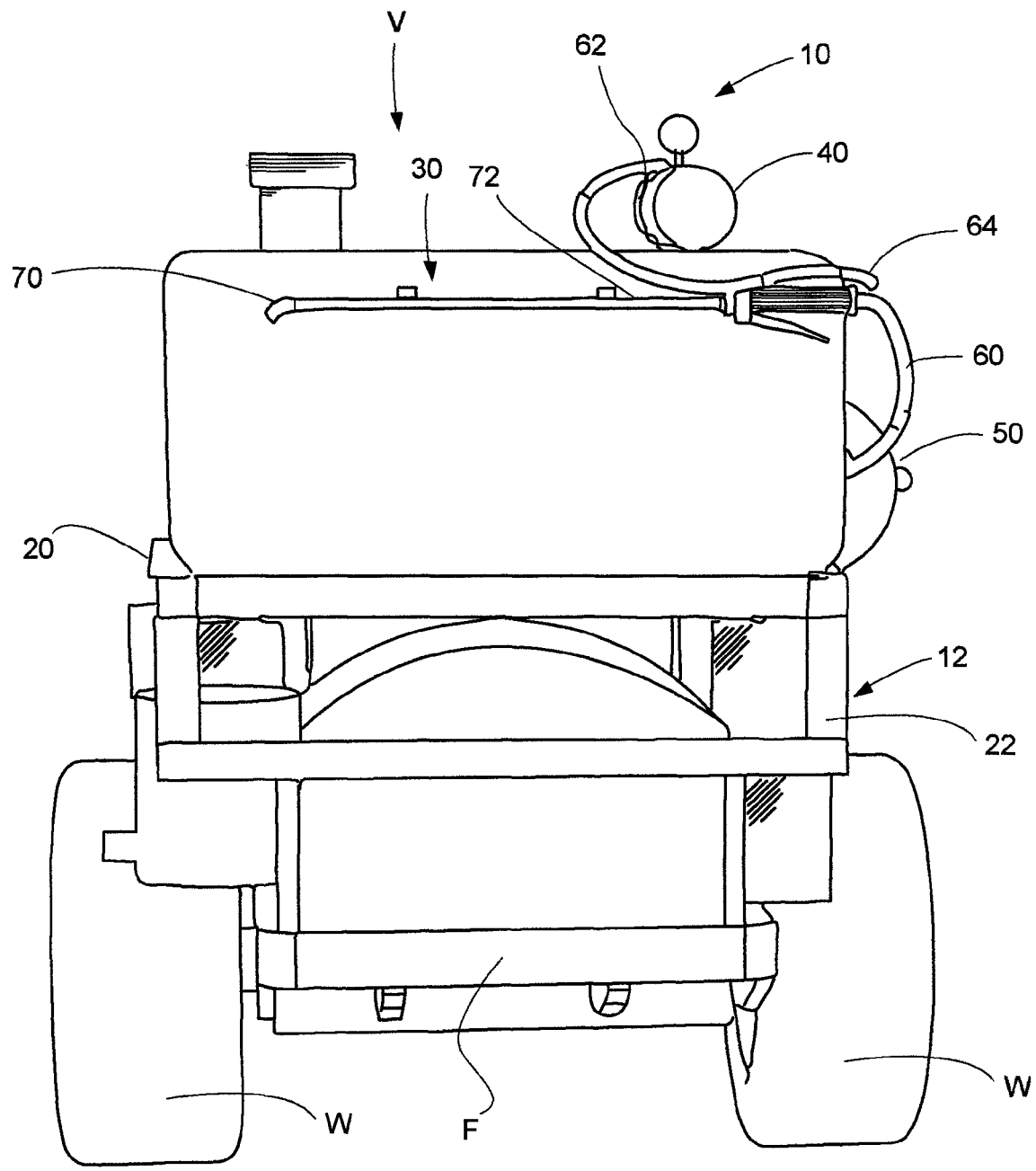
FIG. 2 is a rear schematic view of the lawn care vehicle and the kit of the invention shown in FIG. 1.

Referring to FIGS. 1 through 5, it can be understood that the present invention is embodied in a kit 10 for retrofitting a vehicle V, such as a lawn mower or tractor, into a lawn care vehicle. With particular reference to FIGS. 1 and 2, kit 10 comprises a base 12 mounted on a support frame F which is located on an aft end of vehicle V. Base 12 includes a first portion 20 which extends in a horizontally and outwardly from the aft end of the vehicle and, a second portion 22 which extends vertically and downwardly from the first portion 20 towards the ground when base 12 is secured to the aft end of vehicle V.

Still referring to FIGS. 1 and 2, a liquid tank 30 is mounted on first portion 20 of base 12 and a pump 40 is fluidically connected to the liquid tank. Generally, liquid tank 30 will contain a liquid lawn treatment chemical, such as a fertilizer, weed killer, or insecticide. A hose reel 50 is mounted on base 12 and a dispensing hose 60 is supported on hose reel 50. As better shown in FIG. 2, the dispensing hose 60 has a first end 62 fluidically connected to pump 40 so as to be fluidically connected to fertilizer tank 30 via pump 40. Dispensing hose 60 also has a second end 64 with a nozzle assembly 70 which is fluidically connected to tank 30 to dispense liquid fertilizer in a manner well-known to those skilled in the art. As shown in FIG. 2, nozzle assembly 70 may be part of a hand-held hose 72 and is fluidically connected to dispensing hose 60 via a suitable valve (not shown), such as, for example, a Y-shape valve which is readily available in the market place and which is well-known to those skilled in the art. It is apparent to those skilled in the art, that a Y-shape valve or similar valve is used to fluidically connect the dispensing hose and the hand-held hose to each other and to liquid tank 30.

Referring particularly to FIG. 1, a fluid flow control system 80 is located on lawn care vehicle V adjacent to the driver's seat S of the vehicle and includes suitable electronic elements (not shown) for controlling the operation of pump 40. Such suitable electronic elements are well-known to those skilled in the art; and therefore, the details thereof are not discussed herein. Fluid flow control system 80 enables the adjustment of the power provided from the vehicle V in order to maintain the desired control over the pressure and fluid velocity of the spraying of the fluid from liquid fertilizer tank 30 and into the dispensing hose 60 and the hand-held hose 72.

Figure 3:
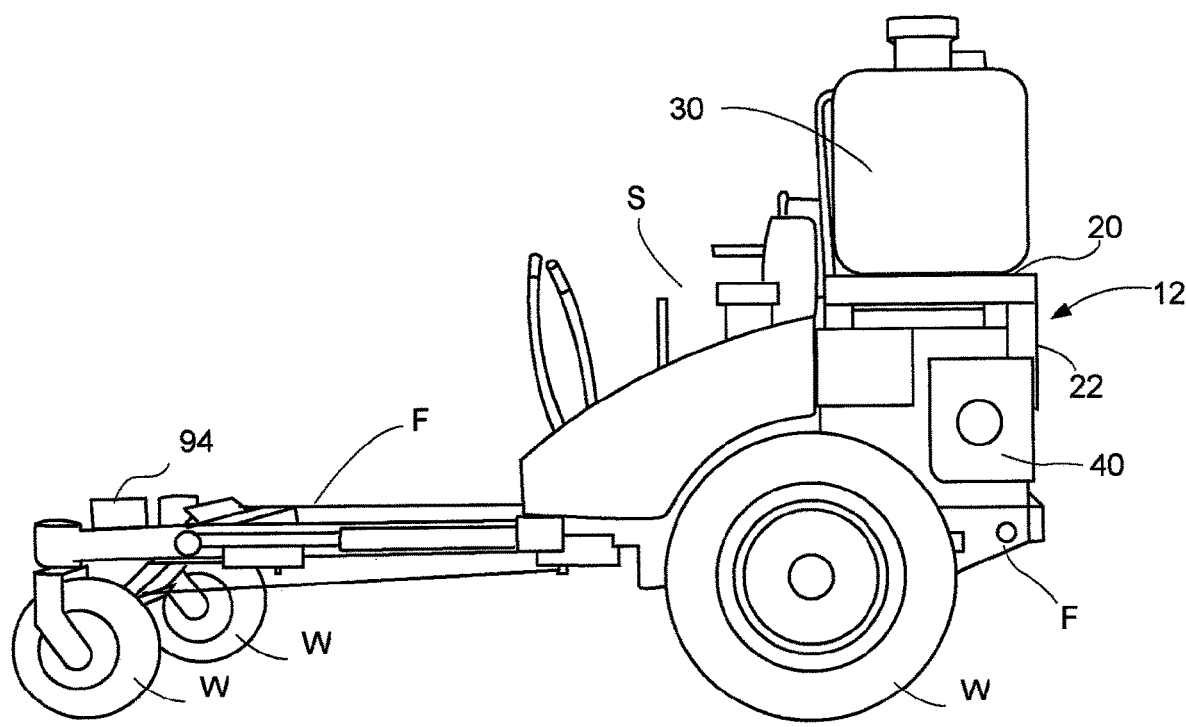
FIG. 3 is a side elevational, schematic view of the kit of the invention illustrating a further arrangement for some of the components of the kit of the present invention.

FIG. 3 illustrates an embodiment for an arrangement of kit 10 of the present invention in which fertilizer tank 30 is supported on base 20, which, in turn, is supported by frame F of the lawn care vehicle V, and pump 40 is supported through suitable means, within base 20 and below fertilizer tank 30.

Figure 4:
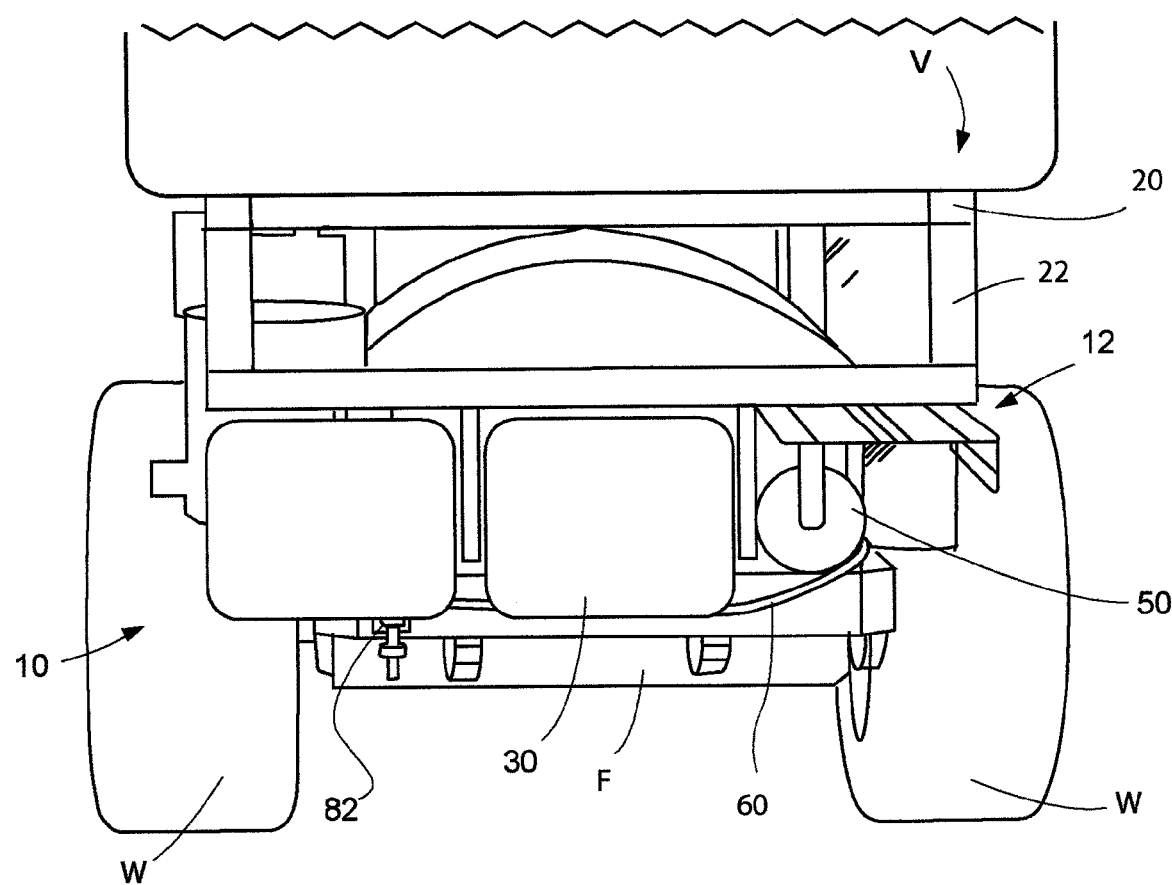
FIG. 4 is a rear elevational, schematic view of the kit of the present invention illustrating a second embodiment for an arrangement of the components of the kit of the present invention.

FIG. 4 illustrates a further embodiment for an arrangement of kit 10 of the present invention in which base 12 is provided aft of the lawn care vehicle V, and base 12 supports, through suitable means, liquid fertilizer tank 30, a water tank 82, and hose reel 50. As is apparent, liquid fertilizer tank 30, water tank 82, and hose reel 50 are located below the first portion 20 and second portion 22 of base 12.

Figure 5:
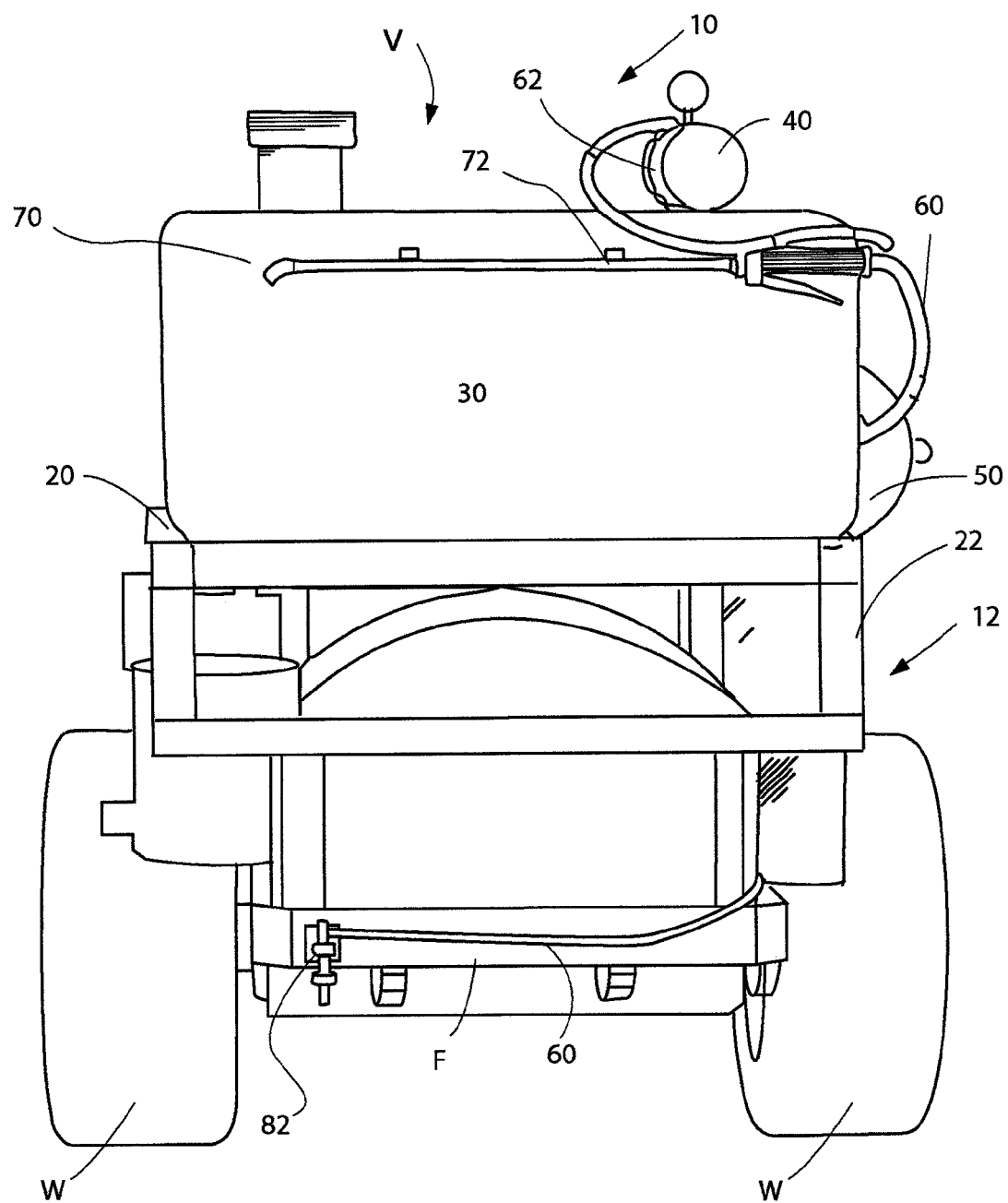
FIG. 5 is a rear elevational, schematic view of the vehicle of FIG. 1 illustrating an arrangement for the hoses of the kit of the present invention on the base of the kit.

The dispensing hose 60 and hand-held hose 72 of kit 10 may be positioned at various locations on lawn care vehicle V. Such locations are shown in FIGS. 1 and 5. As particularly shown in FIG. 1, lawn care vehicle V further includes a front bracket 90 which is located between and adjacent to front wheels W. As shown in FIG. 1, hose 60 extends below frame F of vehicle V with nozzle assembly 70 being supported by front bracket 90. As shown in FIG. 5, hose 60 is supported by base 12. Dispensing hose 60 with its nozzle assembly 70 and hand-held hose 72 with its nozzle assembly 70 enable the kit 10 of the present invention to provide highly efficient spraying and to maximize the amount of coverage of spraying while minimizing the amount of drift or inefficient spraying. Fluid flow control system 80 enables the spraying of the fluid to be maintained at a constant pressure at any vehicle speed.

In an embodiment of the invention, nozzle assembly 70 of dispensing hose 60 and nozzle assembly 70 of hand-held hose 72 include a magnetic base 82 as particularly shown in FIG. 5, so that nozzle assemblies 70 may be mounted at any desirable location on lawn care vehicle V. As shown in FIG. 1, dispensing hose 60 and nozzle assembly 70 are shown as being extended from vehicle V and lying on the ground. It is to be appreciated that dispensing hose 60 and hand-held hose 72 may be positioned at any desirable location which is easily accessible by the operator of the lawn care vehicle V. Kit 10 of the invention may be suitably attached to vehicle V through a system of bolts and fasteners (now shown) in a manner obvious to those skilled in the art.

Referring again to FIG. 1, a counterweight 94 is mounted on lawn care vehicle V. The counterweight 94 shown in FIG. 1 is provided on the front wheel W shown to the right in FIG. 1 and is provided for obvious reasons, particularly, on a vehicle that may generally be used for grass collection.

As is apparent from the above, kit 10 of the present invention does not require utilization of a trailer to carry the spraying system nor does it require a second power source for operation of the hoses 60 and 72. Additionally, kit 10 of the present invention provides spraying of a fertilizer, weed killer, or insecticide with at least two types of different spraying mechanisms. It can be appreciated to those skilled in the art, that additional hoses 60 may be added to the system of the invention via the use of different suitable valves readily available in the market place.

The kit 10 of the present invention for retrofitting a vehicle, such as a lawn mower or tractor, into a lawn care vehicle for distributing liquids for treatment of a lawn may, in general, be maneuverable without damaging the lawn or ground surface; may provide efficient spraying in terms of the rate and application of the liquids for the treatment of the lawn; and may be easily stored, transported, and then expanded in various arrangements for the required use.

While the present invention has been described in connection with the preferred embodiments of the various figures, it is to be understood that other similar embodiments may be used or modifications and additions may be made to the described embodiments for performing the same function of the present invention without deviating there from. Accordingly, it is intended by the appended claims to cover all such changes and modifications as come within the spirit and scope of the invention.

What is claimed is:

1. A kit for retrofitting a vehicle into a lawn care vehicle for treatment of a lawn, the kit comprising:
   a base mounted on an aft end of a vehicle, and having a first portion extending outwardly from the aft end of the vehicle and a second portion extending downwardly from the first portion of the base;
   a liquid tank mounted on the first portion of the base and containing a lawn treatment chemical;
   a pump fluidically connected to and supported by the liquid tank;
   a hose reel mounted on the base of the vehicle;
   at least one dispensing hose supported by the hose reel and having a first end fluidically connected to the pump for fluidically connecting the dispensing hose to the liquid tank and having a nozzle assembly attached to a second end for dispensing the liquid lawn treatment chemical;
   at least one hand held hose having a nozzle assembly and fluidically connected to the at least one dispensing hose and the pump; and
   a fluid flow control system mounted on the vehicle and connected to the pump for operation of the pump and the dispensing of the liquid lawn treatment chemical from the at least one dispensing hose and the hand-held hose.

2. The kit of claim 1, wherein the liquid tank is supported by and located above the first portion of the base.

3. The kit of claim 1, wherein the vehicle further comprises a front bracket mounted to the front end of the vehicle, and wherein the nozzle assembly of the at least one dispensing hose is mounted on the front bracket of the vehicle.

4. The kit of claim 3, wherein the front bracket of the vehicle is mounted adjacent to front wheels of the vehicle, and wherein the at least one dispensing hose is mounted on the front bracket adjacent to the front wheels of the vehicle.

5. The kit of claim 1, further comprising a counterweight mounted on the vehicle.

6. A kit for retrofitting a vehicle into a lawn care vehicle for treatment of a lawn, the kit comprising:

a base mounted on an aft end of a vehicle, and having a first portion extending outwardly from the aft end of the vehicle and a second portion extending downwardly from the first portion of the base;

a liquid tank supported below the first portion of the base and containing a lawn treatment chemical;

a pump fluidically connected to the liquid tank;

a hose reel mounted on the base of the vehicle;

at least one dispensing hose supported by the hose reel and having a first end fluidically connected to the pump for fluidically connecting the dispensing hose to the liquid tank and having a nozzle assembly attached to a second end for dispensing the liquid lawn treatment chemical;

at least one hand held hose having a nozzle assembly and fluidically connected to the at least one dispensing hose and the pump; and a fluid flow control system mounted on the vehicle and connected to the pump for operation of the pump and the dispensing of the liquid lawn treatment chemical from the at least one dispensing hose and the hand-held hose.

7. The kit of claim 6, wherein the hose reel is located beneath the first portion of the base.

8. The kit of claim 1 further including a magnetic device associated with the nozzle assembly of the at least one dispensing hose and with the nozzle assembly of the hand-held hose.

9. A kit for retrofitting a vehicle into a lawn care vehicle for treatment of a lawn, the kit comprising:

a base mounted on an aft end of a vehicle, the base including a first portion extending outwardly from the aft end of the vehicle and a second portion extending downwardly from the second portion of the base;

a liquid tank mounted on the first portion of the base and located above the first portion of the base and containing a lawn treatment chemical;

a pump fluidically mounted on the liquid tank;

a hose reel mounted on the base;

a dispensing hose supported on the hose reel, the dispensing hose having a first end fluidically connected to the pump for fluidically connecting the dispensing hose to the liquid tank and a second end and a nozzle assembly attached to the second end of the dispensing hose for dispensing the liquid lawn treatment chemical;

a hand-held hose fluidically connected to the dispensing hose and having a nozzle assembly;

a magnetic device associated with the nozzle assembly of the dispensing hose for positioning and securing the dispensing hose in a predetermined location on the vehicle;

a magnetic device associated with the nozzle assembly of the hand-held hose for positioning and securing the hand-held hose in a predetermined location on the vehicle;

a control system located on the vehicle and electrically connected to the pump for controlling the pump and the dispensing of the liquid lawn treatment chemical from the dispensing hose and the hand-held device; and a counterweight mounted on the vehicle.

10. The kit of claim 6, further comprising a water tank mounted on the second portion of the base of the vehicle.

11. The kit of claim 6, wherein the pump is supported beneath the liquid tank.

* * * * *